(No Model.)

J. SPRUCE.
BELT FASTENER.

No. 328,822. Patented Oct. 20, 1885.

Witnesses:
J. N. Shumway
Jos. C. Earle

James Spruce,
Inventor
By atty

UNITED STATES PATENT OFFICE.

JAMES SPRUCE, OF WATERBURY, CONNECTICUT, ASSIGNOR TO THE SCOVILL MANUFACTURING COMPANY, OF SAME PLACE.

BELT-FASTENER.

SPECIFICATION forming part of Letters Patent No. 328,822, dated October 20, 1885.

Application filed March 23, 1885. Serial No. 159,721. (No model.)

*To all whom it may concern:*

Be it known that I, JAMES SPRUCE, of Waterbury, in the county of New Haven and State of Connecticut, have invented a new Improvement in Belt-Fasteners; and I do hereby declare the following, when taken in connection with accompanying drawings and the letters of reference marked thereon, to be a full, clear, and exact description of the same, and which said drawings constitute part of this specification, and represent, in—

Figure 1:
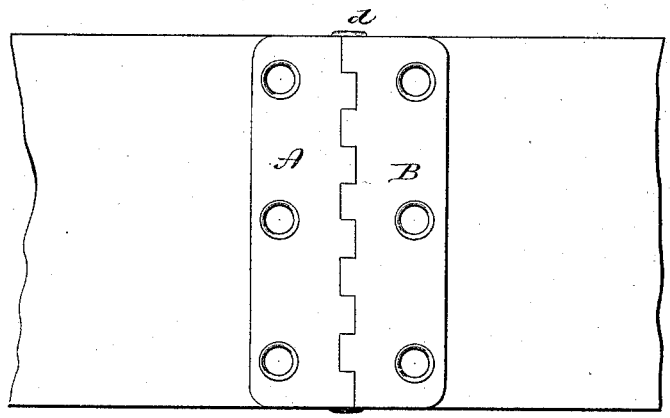
Figure 2:
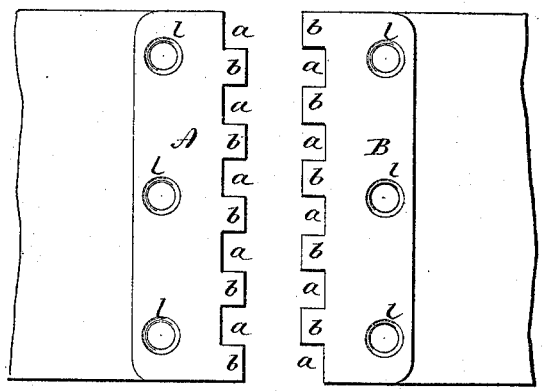
Figure 4:
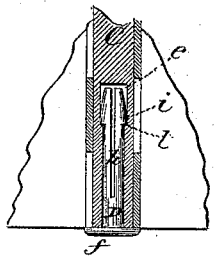
Figure 3:
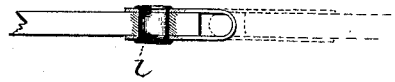
Figure 5:
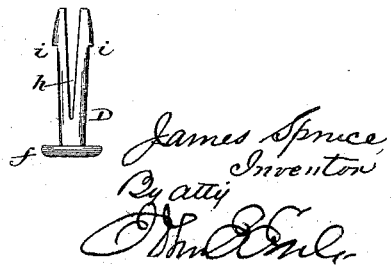

Figure 1, a face view, showing the two parts of the fastener as secured together; Fig. 2, the same two parts detached; Fig. 3, an edge view, one of the parts detached, showing the other part engaged, in broken lines; Fig. 4, a longitudinal section through the tubular portion of the pintle enlarged; Fig. 5, the spring-pin detached.

This invention relates to an improvement in that class of belt-fasteners which consists of two parts adapted to be readily engaged or disengaged, and so that a belt may be applied or removed from its pulleys, as occasion may require, and particularly to that class in which the fastener is constructed in two parts, one part attached to one end of a band and the other part to the other end, the meeting edges of the two fasteners constructed with corresponding knuckles which set together like a hinge, and through which a pintle is applied to connect the two parts, the object of the invention being to secure the pintle in its place to hold the fasteners together, but yet permit of the ready removal of the pintle without the necessary employment of instruments; and the invention consists in a fastener composed of two parts of sheet metal, each part bent into U shape, and so that the legs of the U on each part may embrace its end of the belt, the bend of the U of each part correspondingly notched to form knuckles, and so that the projections on the one will set into the spaces or notches on the other, and through which a pintle is longitudinally introduced, said pintle headed at one end and constructed tubular at the opposite end, with a headed split or spring pin adapted to be introduced into the tubular end of the pintle and make substantial engagement therewith, the head of the pin forming a head for the pintle at that end to prevent its escape, yet so that the pin may be readily removed for the withdrawal of the pintle when occasion requires.

A represents the one part, and B the other part, of the fastener. Each part is made, as seen in Fig. 3, from sheet metal bent into U shape, the length of the fastener corresponding substantially to the width of the belt, and so that the legs of the U may pass onto the end of the belt, one upon one side and the other upon the opposite side, as seen in Fig. 3, the bend being semicircular. At the bend notches *a* are cut more or less in number, forming intermediate projections, *b*. The other part, B, is constructed with like notches, *a*, corresponding to the projections *b* on the other part, leaving intermediate projections, *b*, corresponding to the notches *a* on the other part—that is to say, the two parts at their bend are constructed with a series of projections with intermediate recesses, the recesses on the one corresponding to the projections on the other, and so that the two may interlock, as seen in Fig. 1. The semicircular bend of the two, when brought together, leaves a circular opening through the several projections, as indicated in broken lines, Fig. 3. After the two parts are secured to the respective ends of the band, as indicated in Fig. 2, a pintle, C, having a head, *d*, at one end, is passed through the two parts when set together, the length of the pintle corresponding to the lengths of the fasteners. At the end of the pintle opposite its head it is made tubular—that is, with a concentric recess, *e*, as seen in Fig. 4.

B is a pin constructed with a head, *f*, corresponding to the head *d* on the pintle, the body of the pin adapted to pass into the tubular end of the pintle, as seen in Fig. 4, and so that the head will abut against the end of the fastener, as does the head of the pintle at the opposite end. This pin is split, as indicated at *h*, and has a certain amount of elasticity, and when open, as seen in Fig. 5, is of greater width than the diameter of the recess in the pintle. Near its inner end the pin is constructed with a shoulder, *i*, on one or both parts, and the interior of the recess of the pintle is constructed with a corresponding shoulder, $l$, so that when the pintle is introduced, as seen in Fig. 4, which is done by bringing the two ends together, then forced inward, the reaction of the spring of the two parts will cause the shoulders $i$ and $l$ to engage when the pin is fully inserted. The shoulders form an obtuse angle, and so that while they engage to hold the pin in its place they permit it to be drawn therefrom by the application of fingers to the head of the pin. Upon such withdrawal of the pin the pintle is readily removed, and the two parts may be disengaged.

This construction of the pin and pintle avoids the use of instruments in the detachment or engagement of the belt, as would be the case were the pivot riveted or secured by screws.

The two parts of the fastener are best secured to the respective ends of the belt by eyelets. The two legs of the U are correspondingly perforated, and when applied to the ends of the belt like perforations are made through the belt, then eyelets introduced from one side and set down upon the opposite side, as shown in the drawings. The eyelets are much more readily secured than solid rivets, and when it is required to remove either of the parts of the fastener, as for shortening the belt, the eyelets are more easily removed than solid rivets, for the reason that in solid rivets the upset end or head must be cut away before the rivet can be removed, and such cutting is liable to injure the surrounding part, whereas the upset edge of the eyelet may be readily bent into the hole and without injury to the surrounding parts.

From the foregoing it will be understood that I do not claim, broadly, a belt-fastener formed in two parts and united with a pintle in a hinge-like manner, as such, I am aware, is not new; but What I do claim is—

1. The herein-described belt-fastener consisting of two parts, each adapted to be attached to the respective ends of a belt to be joined, their adjacent edges constructed with corresponding projections and recesses, said projections having an opening transversely through them, combined with a pintle having a head at one end, and extending through the projections on the two parts, the unheaded end of said pintle made tubular, and a headed pin, D, the body split and the parts spread to form springs, and adapted to enter the tubular end of the pintle, and the spring parts to engage the interior of the pintle, substantially as described.

2. The herein-described belt-fastener consisting of two parts, each adapted to be attached to the respective ends of a belt to be joined, their adjacent edges constructed with corresponding projections and recesses, said projections having an opening transversely through them, combined with a pintle having a head at one end, and extending through the projections on the two parts, the unheaded end of said pintle made tubular, and a headed spring-pin, D, adapted to enter the tubular end of the pintle, the pin and recess in the pintle constructed with corresponding shoulders, substantially as described.

3. A belt-fastener consisting of two parts, A B, each constructed from sheet metal bent into U shape, the two legs of the U of each part adapted to embrace the respective ends of the belt, the bend of the two parts constructed with recesses $a$, to form intermediate projections, $b$, and so that the projections on one part will set into the recesses of the opposite part, combined with a headed pintle, C, extending through the projections of the two parts, the said pintle constructed tubular at its unheaded end, and a headed pin, D, the body of which is split and the parts spread to form springs adapted to enter the tubular end of the pintle, and the spring parts to engage the interior of the pintle, substantially as described.

4. A belt-fastener consisting of two parts, A B, each constructed from sheet metal bent into U shape, the two legs of the U of each part adapted to embrace the respective ends of the belt, the bend of the two parts constructed with recesses $a$, to form intermediate projections, $b$, and so that the projections on one part will set into the recesses of the opposite part, combined with a headed pintle, C, extending through the projections of the two parts, the said pintle constructed tubular at its unheaded end, and the headed spring-pin D, the body of the pin and the interior of the pintle constructed with corresponding shoulders, substantially as described.

JAMES SPRUCE.

Witnesses:
F. J. GORSE,
JOS. C. EARLE.